United States Patent [19]

Hofmann

[11] Patent Number: 4,984,892
[45] Date of Patent: Jan. 15, 1991

[54] APPARATUS FOR THE OPTICAL SCANNING OF A SPHERICAL OR SEMISPHERICAL SPACE

[75] Inventor: Otto Hofmann, Kirchstockach, Fed. Rep. of Germany

[73] Assignee: Messerschmitt-Boelkow-Blohm GmbH, Munich, Fed. Rep. of Germany

[21] Appl. No.: 313,086

[22] Filed: Feb. 21, 1989

[30] Foreign Application Priority Data

Feb. 24, 1988 [DE] Fed. Rep. of Germany ....... 3805642

[51] Int. Cl.[5] .................... G01B 11/00; H01G 3/14; G02B 26/08
[52] U.S. Cl. .................................... 356/372; 350/6.4; 250/234; 250/235
[58] Field of Search ............... 356/372, 375, 379–380, 356/384, 386, 387; 350/6.4–6.91, 376; 250/234, 235, 236, 558

[56] References Cited

U.S. PATENT DOCUMENTS 4,246,612 1/1981 Berry et al. .................... 350/6.8

FOREIGN PATENT DOCUMENTS 2951592 7/1981 Fed. Rep. of Germany .
3046744 7/1982 Fed. Rep. of Germany .

Primary Examiner—Richard A. Rosenberger
Assistant Examiner—Hoa Pham
Attorney, Agent, or Firm—W. G. Fasse; D. H. Kane, Jr.

[57] ABSTRACT

A spherical space, especially a hemispherical space, is scanned by an optical scanner for the presence of a target in the scanned spaced. The optical scanner includes an objective lens (4) which scans the space through an optical deflector (1 or 7) arranged upstream of the objective lens and rotatable about two axes, one of which is the optical axis (2, 3) of the objective lens. At least one tiltable prism (5) is arranged downstream of the objective lens (4). At least one row of sensors (6) is arranged downstream of the prism (5) for converting received optical signals into respective electrical signals which are processed under control of a central processing unit (CPU) including a computer and memory (21). Drives (9, 16) controlled by the CPU rotate the deflectors (1 or 7) about the two axes (2, 3) extending perpendicularly to each other. The imaging speed at which an image passes the detector row (6) is always constant independently of the instantaneous viewing or scanning direction.

7 Claims, 5 Drawing Sheets

APPARATUS FOR THE OPTICAL SCANNING OF A SPHERICAL OR SEMISPHERICAL SPACE

FIELD OF THE INVENTION

The invention relates to an apparatus and to a method for the optical scanning of a spherical or hemispherical space for ascertaining the presence of objects moving in said space. Thus, the invention can be used for target acquisition.

BACKGROUND INFORMATION

Spacial scanning systems are known, for example, for monitoring a large space angle as described in German Patent Publication 2,951,592 and German Patent Publication 3,046,744. However, the angular scanning range of conventional devices is rather limited, for example, the angular range in one direction is maximally 60°, while in the other direction it is only 7°.

OBJECTS OF THE INVENTION

In view of the foregoing it is the aim of the invention to achieve the following objects singly or in combination:

to provide an optical scanning system capable of scanning a spherical or hemispherical space completely, that is, without any gaps of unscanned zones in the scanning pattern;

the scanning shall take place in a short raster scale applicable spacially as well as with respect to time so that the presence of objects rapidly moving through the scanned space, can be ascertained or known with certainty; and to provide a scanning system that for practical purposes finds its limitations only in the selected type of sensor and in the type of energy and radiation to be measured, and not by any limitations to which conventional devices have been subject, in other words, the invention avoids conventional scanning angle limitations.

SUMMARY OF THE INVENTION

The present system for an optical scanning of a spherical space or a portion of said spherical space, comprises, according to the invention, the following features, an objective lens arranged relative to an image plane and having an optical axis, a row of detector means arranged in said image plane and symmetrically to said optical axis, a tiltable prism located between said objective lens and said image plane, said tiltable prism being mounted for rotation about said optical axis, an optically deflecting element mounted for rotation about two axes including said optical axis in a beam path ahead of said objective lens whereby said optical axis forming a primary axis, lies in the optical axis of the objective lens and a secondary axis arranged at a right angle to said primary axis, first drive means for rotating said deflecting element about said primary axis, means for transmitting rotation of said deflecting element to said tiltable prism at a reduction ratio of 2:1, wherein said row of detector means is fixed and coordinated to said tiltable prism and to a position of said secondary axis of said deflecting element in such a way that the optical axis of individual detector beam bundles deflected by said deflecting element lie in the same plane as the axis of the objective lens, namely of the primary axis of the deflecting element, second drive means for rotating said deflecting element about said secondary axis, first counter means for measuring the rotation $\alpha$ of the deflecting element about the primary axis, means for controlling in closed loop fashion the revolutions per time unit of said deflecting element, depending on a secondary rotation $\phi$, so that said revolution assumes the value $$U_\alpha = \frac{U_O}{\cos \phi},$$

wherein $\phi$ is an angle of the elevational direction of a measuring beam bundle and $U_O$ is the number of revolutions per time unit for $\phi=0°$, and second counter means or measuring the rotation $\phi/2$ of the deflecting elements about the secondary axis, and means for controlling the rotational speed in such a way that it assumes the value $\dot\phi = U_\alpha \Delta\phi$, whereby $$\Delta\phi = \frac{s}{f} = \frac{i \cdot a}{f}$$

represents the angular range of said row of detector means and s is the length of the row of detector means, f is the focal width of the objective lens, i is the number of the individual detectors in the row, and "a" is the distance between the centers of gravity of the individual detectors.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1A:
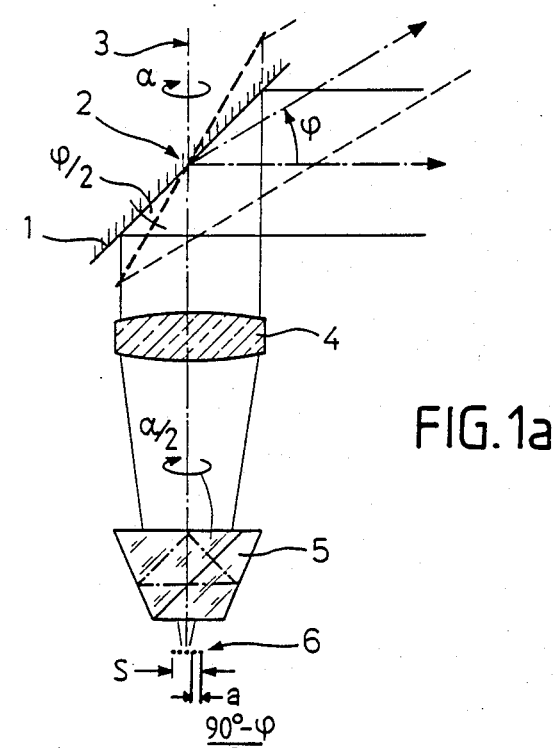
FIG. 1a shows an optic for the present system, including a turnable or tiltable prism and a mirror.
Figure 1B:
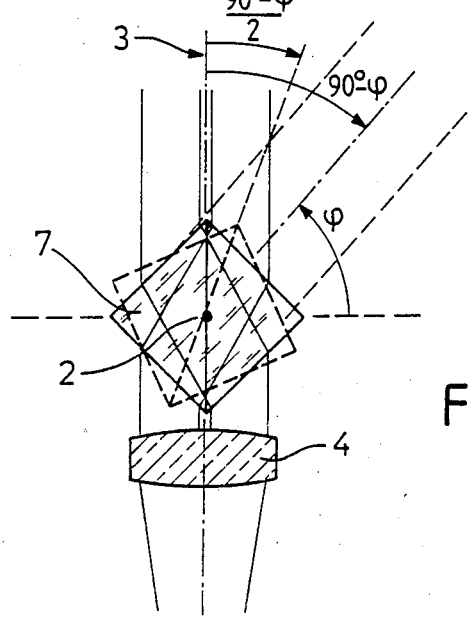
FIG. 1b shows a modified optic with a double prism for one sensor.

Two structural embodiments of the present scanning device are schematically illustrated in FIGS. 1a and 1b. A plurality of detectors 6 are arranged in a row in the image plane of an objective 4. The detectors 6 are, for example, highly sensitive infrared detectors. A turning or tiltable prism, such as a Schmidt prism 5, is arranged between the image plane or detectors 6 and the objective lens 4. The prism 5 is mounted for rotation about the optical axis 3 of the objective lens 4. An optically deflecting element, such as a mirror 1 as shown in FIG. 1a or a double prism 7 as shown in FIG. 1b, is mounted for rotation about the optical axis 3 which considered to be the primary axis, and about a secondary axis 2. The primary axis 3 coincides with in the optical axis of the objective lens 4. The secondary axis 2 extends at a right angle to the primary axis 3 in the image plane of the mirror 1 or the prism 7. A rotation of the mirror 1 or of the prism 7 about the primary axis 3 results in an azimuth rotation $\alpha$ of the entering or exiting parallel beam bundle about the primary axis 3. This rotation also produces an image rotation $\alpha$ of the sensors about the optical axis 3 of the objective lens 4. The image rotation $\alpha$ is compensated by a simultaneous rotation $\alpha/2$ of the rotatable prism 5, so that the row of detectors 6 arranged in the image plane is always in the plane of the angle $\phi$ on the side of the object, said angle $\phi$ representing the elevation angle as shown in FIG. 1a. The image or prism rotation $\phi/2$ about the secondary axis 2 causes a change in the elevational direction of the entering or exiting beam bundle by the angle $\phi$. The rotational positions $\phi/2$ and $\alpha$ of the deflecting element, such as the mirror 1 or the prism 7, are directly measured by angle position sensors which are rigidly coupled with the respective rotational axes. An angle sensor 17 measures the $\alpha$ rotation of the prism axis or primary axis 3. The angular sensor 10 measures the $\phi/2$ rotation of the secondary axis 2, please see FIG. 3. If desired, a further angular sensor not shown can directly measure the rotation $\alpha/2$ of the rotatable prism 5 in order to take into account in the calculation any possible errors of a reduction gear drive 22 shown in FIG. 3.

This arrangement permits a scanning of a spherical space, of a calotte, or of a spherical section, whereby the sensor row 6 on the object side is always oriented in the direction of the meridian, and whereby the optical axis of the deflected beam bundles of the individual detectors lie in the same plane with the primary rotational axis 3 or with the axis of the objective lens 4. The deflection range of the mirror 1 or of the prism 7 determines the elevation h of the spherical zone or of the calotte, see FIG. 2. A servomotor 16 shown in FIG. 3 which is controllable in a closed loop control, drives the mirror 1 or the prism 7 for the primary azimuth rotation $\alpha$, whereby the compensation rotation $\alpha/2$ of the turnable prism 5 is accomplished by the reduction gear drive or coupling 22. The drive 16 and the coupling 22 is not shown in FIG. 1. The drive for the secondary rotation $\phi/2$ of the mirror 1 or of the deflection prism 7 is accomplished also by a servomotor 9 shown in FIG. 3 controllable in closed loop fashion.

When the mirror 1 or the prism 7 rotates through the angle $\alpha$ about the primary axis 3, the detectors 6 scan a ring-shaped spherical section, the angular width of which corresponds to $\Delta\phi$. The angular width $\Delta\phi$ is determined by the length "s" of the row of detectors 6 or by the number "i" and of individual detector, by the spacing "a" between the centers of gravity of the individual detectors 6 in the row, and by the focal width f of the objective lens according to the following equation (1)

$$\Delta\phi = \frac{s}{f} = \frac{i \cdot a}{f} \qquad \text{Equation (1)}$$

If, simultaneously with the azimuth rotation $\alpha$ the elevational direction $\phi$ of the scanning beam bundle is entered in such a way that the azimuth rotation $\alpha$ of 360° changes the elevational direction by a value $\Delta\phi$, then a continuous gapless scanning of the spherical space or of a spherical calotte or spherical zone takes place. The rotational speed $\dot\phi$ of the elevational angle $\phi$ thus is expressed $$\dot\phi = \Delta\phi \cdot U_\alpha \qquad \text{Equation (2)}$$

whereby $U_\alpha$ is the instantaneous number of revolutions per second of the deflection mirror 1 about the primary axis 3.

Further, it must be assured that the speed of imaged objects in the image plane respectively into the row of detectors 6 is always constant. It follows, that the rotational speed $U_d$ of the deflector mirror 1 or of the prism 7 around the primary axis 3 must increase with an increasing elevational angle $\phi$ by the factor $$\frac{1}{\cos\phi}$$

as can be easily proven.

The imaging speed $v_b$ at the row of detectors 6 in the image plane is $$v_b = f \cdot 2\pi \cdot U_\alpha \cdot \cos\phi \qquad \text{(Equation 3)}$$

wherein said imaging speed $v_b$ is the speed at which an image passes over said row of detectors 6 in the image plane, wherein f is the focal width of the objective lens 4, $U_\alpha$ is the instantaneous rotational speed of $\alpha$ in revolutions per second about the primary axis 3, and wherein $\phi$ is said elevational angle.

If one starts with a selectable constant imaging speed $v_b$ then the nominal number $U_0$ of revolutions per second for $\phi = 0°$ is determined as follows:

$$U_0 = \frac{v_b}{2\pi f} \qquad \text{(Equation 4)}$$

If the elevational angle $\phi$ changes, then the instantaneous number of revolutions $U_\alpha$ is determined as follows $$U_\alpha = \frac{U_0}{\cos\phi} \qquad \text{Equation (5)}$$

If Equation (5) is in inserted in Equation (3) one obtains that $v_b = f \cdot 2\pi \cdot U_0$ is constant as required. Accordingly, the rotational speed $\dot\phi$ of the elevational angle $\phi$ is:

$$\dot{\phi} = \Delta\phi \cdot U_\alpha = \Delta\phi \cdot \frac{U_O}{\cos\phi} \qquad \text{Equation (6)}$$

Thus, it is assured that the row of detectors 6 in the image plane scans during equal time intervals, equal space angles or spherical surfaces.

Figure 3:
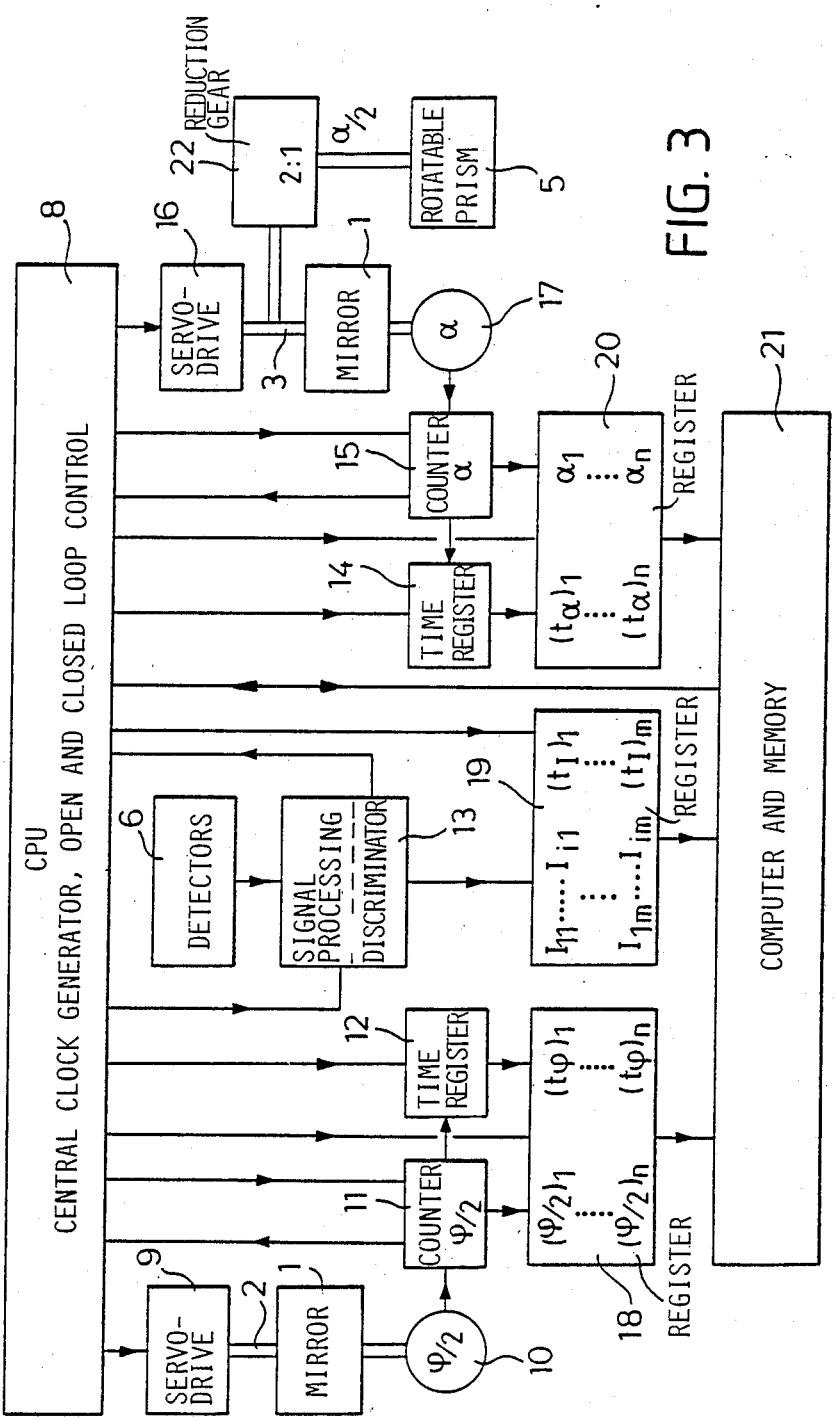
FIG. 3 is a block circuit diagram of a central processing unit including a computer open loop control and a closed loop control.

The present apparatus is controlled by an electronic computer module, the simplified block circuit diagram of which is shown in FIG. 3. A central processing unit 8 provides an open loop and closed loop control and includes a clock signal generator for synchronizing all functions. The central processing unit 8 controls first and second drive servomotors 9 and 16 to cause the rotations $\phi/2$ and $\alpha$ of the deflecting elements such as the mirror 1 or the prism 7. These rotations are sensed by the respective angular position sensors 10 or 17 respectively. The measured rps (revolutions per second) are indicated by a first counter 11 showing the measured value $\phi/2$ and by a second counter 15 indicating the measured value $\alpha$. Additionally, the measured values are supplied to the central processing unit 8. Based on the measured angular value and measured time differences between measurements following each other, the central processing unit 8 computes a closed loop control signal for controlling the number of revolutions per second. The calculation is performed in accordance with the above given equations 5 and 6.

The radiation signals provided by the row of detectors 6 in the image plane are amplified in the signal processing unit 13 and digitized if desired. The so obtained signals pass through a threshold value discriminating circuit. If signals pass the discriminating circuit, the passing signals and the respective time slots are transmitted to the signal register 19.

The angle counter registers 11 and 15 contain the actual angular positions of $\phi/2$ and $\alpha$ and the time registers 12 and 14 contain the respective time slots. It is not necessary that the angular sensors 10 and 17 have the high resolution that is necessary for the measurement or rather for the space scanning. A relatively coarse display or indication interval is sufficient for the measurement as the accurate values can be interpolated between the coarse angular signals.

This is so because simultaneously with the angular indication, a time measurement takes place, so that, it is possible to interpolate the exact angular measurement values from the time measurements. In order to obtain a precise compensating interpolation, a number, for example "n" of sequentially occurring indications or time data are stored in the shift registers 18 and 20. If a new value is entered into the registers, all data are shifted into the next register, whereby the content of the last register is discarded. Signals I from the detectors 6 in the image plane are processed in the same manner, whereby attention must be paid to the fact that simultaneously a number "i" of signals I from the row of detectors 6 is present in parallel. These parallel available signals $I_1 \ldots I_i$ are generated in one time interval and passed into the shift register 19 which corresponds to the angle resolution in the scanning direction. The shift register 19 comprises "m" positions for the signal values and for the time values. These signals $I_1 \ldots I_i$ represent radiation intensities of scanned or measured objects traveling through the scanned space.

Figure 4:
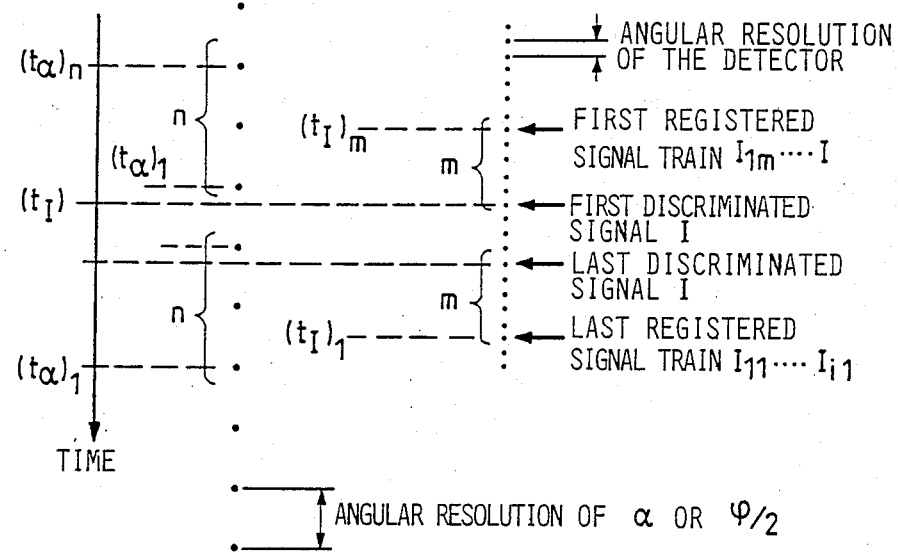
FIG. 4 is a coordination scheme for the data acquisition and information processing.

If now a signal "I" is discriminated, or rather passes the threshold value, the data present in the registers 18 and 20 are transferred into the memory of computer 21, not only down to the last discriminated signal, but also n additional measured values are transferred, so that signals are stored in the memory prior to the first discriminated signal "$I_1$" and subsequent to the last discriminated measured signal $I_i$. The number of angular and time measured values $\phi/2$, $t_\phi$, $\alpha$, $t_\alpha$ is n-1. The number of parallel detector and time signals $I_1 \ldots I_i t_i$ is m-1. The same applies to the signal stored after the last measured value $I_i$. The angular intervals are larger than the signal intervals so that the detector signal values always face stored angular values having a sufficiently large leading and trailing time, see FIG. 4.

A further angle measuring and registering unit for the angular measurements of the rotatable prism 5 may be provided if desired, for the purpose of eliminating any possible errors in the image rotation or scanning. In practice, the functions of the central processing unit and clock signal generator 8 can be performed by the computer and memory modular unit 21.

Figure 2:
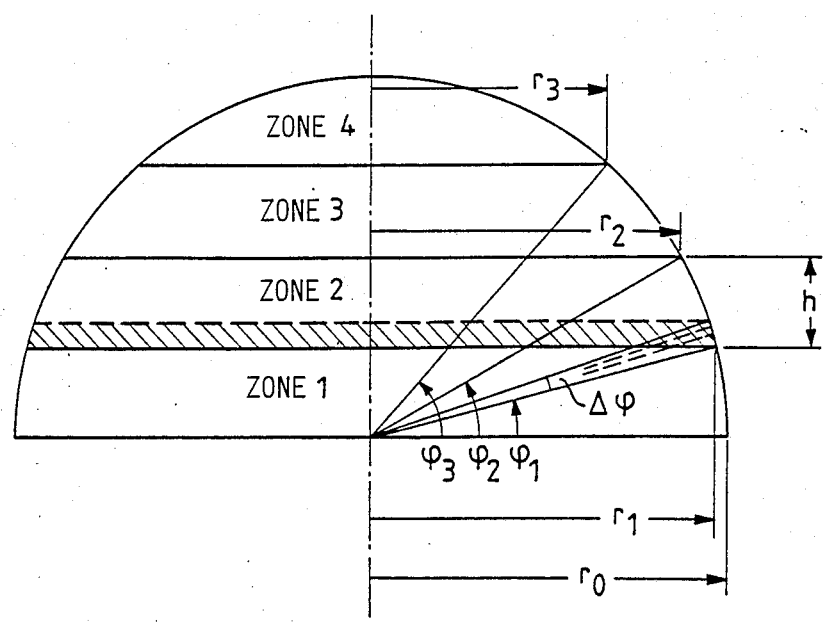
FIG. 2 illustrates a space to be monitored for explaining the operation of the present system.

The apparatus according to the invention is basically capable of scanning the entire volume of a hemisphere, please see FIG. 2, provided that the deflection element 1 or 7, as shown in FIGS. 1a and 1b cover an angular range of $\phi=0°$ to $\phi=90°$. If $\phi=90°$, however, the rotational speeds for $\alpha$ and $\phi$ would become infinitely large, see Equations (5) and (6). Thus, in practice, a certain angular space near $\phi=90°$ cannot be scanned.

Figure 5:
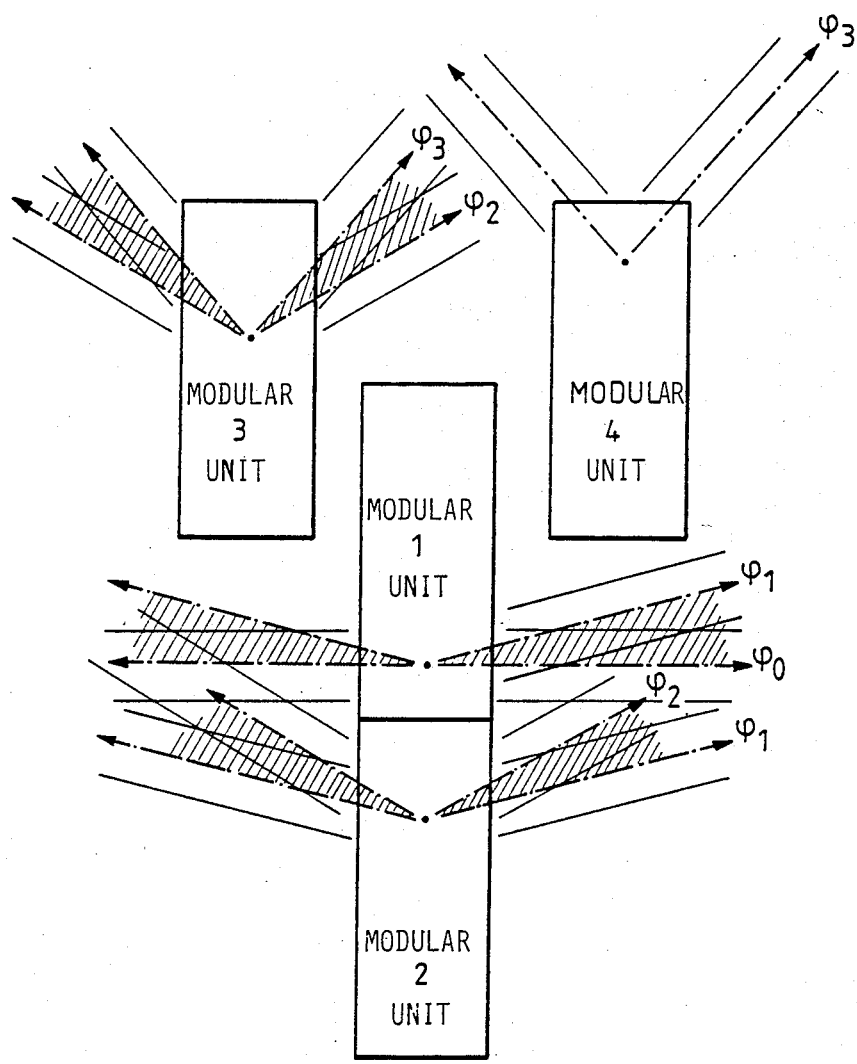
FIG. 5 is an optic with a multiple sensor device illustrating modular construction.

The scanning of an entire hemispherical space with but one row of sensors 6 may encounter practical difficulties under certain circumstances. On the one hand, it is difficult to scan the entire elevational angular range of up to $\phi=90°$ with but one deflection element. On the other hand, the requirement must be satisfied that the scanning must take place within a defined time interval. For example, if a moving target travels at high speed and if that target must be detected as frequently as possible, or within determined time intervals, it becomes necessary to scan a hemispherical space with several such sensors as shown in FIG. 5, whereby each sensor scans an allocated determined spherical zone. In such an embodiment, the spherical zones having the smaller elevational angle $\phi$ will employ a sensor arrangement with a deflection mirror 1 as shown in FIG. 1a, while the detector for the higher elevational angles will employ, for example, a deflection prism 7 as shown in FIG. 1b.

The requirement that all zones shall be scanned with the same frequency and with the same individual or partial scanning or imaging speed makes it necessary that each spherical zone should have the same height "h", see FIG. 2. In such a case, all partial surfaces of the zones are of equal size so that each sensor scans the same surface during the same time interval. The scanning can take place in two different manners. In one possibility, the change of the elevational angle takes place in a pendulum manner between the respective limit values $\phi_1$ and $\phi_2$ as shown in FIG. 2 in accordance with Equation (6). The other possibility provides for a repetition scanning always in the same direction, for example from $\phi_1$ to $\phi_2$ to $\phi_3$ and so forth.

For implementing the present system it is necessary to determine the number of zones and the scanning speed in accordance with rapidly moving targets. In other words, the angular speed $\dot{\phi}$ of the elevational angle $\phi$ must be larger than the angular speed $\omega$ of the target to be detected. This is necessary to avoid scanning gaps under certain circumstances.

As viewed from the row of sensors 6, the angular speed ω of the target becomes ever faster as the distance E between a target and the sensors 6 decreases. Thus, in practice, there is a lower distance limit for the certain detection of the target. This lower distance limit E is calculated as follows $$E \geq \frac{v_y \cdot \cos\phi}{\Delta\phi \cdot U_O} ; \quad \text{Equation (7)}$$

wherein E is the distance to a target from the detector at which target detection is still certain,
wherein $v_y$ is the speed component of the target such as a flying body, which component extends in parallel to the direction of motion of the elevation angle $\phi$. The upper limit of the scanning capability of the present system is determined by the sensitivity and resolution of the row of sensors 6, or rather of the individual sensors forming the row and by the strength of the radiation emitted by the target.

The above target speed $v_y$ and the distance limit E provide the angular velocity ω of the target relative to the location of the sensors 6, thus $$\omega = \frac{v_y}{E} .$$

If several sensor modular units are employed, it is necessary to arrange the modular units relative to each other in such a manner that the individual viewing fields do not interfere with one another. This is necessary in order to properly scan the entire hemisphere with the required scanning speed without creating any scanning gaps. For example, if the scanning is to be accomplished in four zones by four sensor modular units, the height of each individual zone is 0.25 if the radius $r_0=1$, please see FIG. 2.

The limit angles or elevational angles for the zones 1 to 4 are as follows $\phi_0 = 0°$ $\phi_1 = \text{art sin } 0.25 = 14.5°$ $\phi_2 = \text{arc sin } 0.50 = 30°$ $\phi_3 = \text{arc sin } 0.75 = 48.6°$ FIG. 5 shows an example with four sensor modular units covering the just stated angular ranges. The individual modular units may be arranged next to one another or one above the other, depending on such circumstances as the available space and the stability of the system. If the modular units are arranged one above the other as shown for the modular units 1 and 2 in FIG. 5, they need to be mechanically interconnected. The connecting elements must be so constructed that any vignetting of the rotating beam bundles is minimized.

Although the invention has been described with reference to specific example embodiments, it will be appreciated that it is intended to cover all modifications and equivalents within the scope of the appended claims.

What I claim is:

1. An apparatus for an optical scanning of at least a portion of a spherical space, comprising:
   (a) an objective lens means (4) having an optical axis (3), a row of detector means (6) arranged in an image plane for cooperation with said objective lens means (4),
   (b) a rotatable prism (5) located between said objective lens means (4) and said image plane, said rotatable prism (5) being mounted for rotation about said optical axis (3) of said objective lens means,
   (c) an optically deflecting element (1 or 7) mounted for rotation about said optical axis (3) in a beam path ahead of said objective lens means (4), whereby said optical axis (3) of said objective lens means (4) forms a primary axis, said optionally deflecting element being also rotatable about a secondary axis (2) arranged at a right angle to said primary axis (3), first drive means (16) for rotating said deflecting element about said primary axis, speed reduction means for transmitting a rotation of said primary axis (3) to said rotatable prism (5) at a speed reduction ratio of about 2:1, wherein
   (d) said row of detector means (6) is fixed and coordinated relative to said rotatable prism (5) and relative to said secondary axis (2) of said optically deflecting element (1 or 7) in such a way that an optical axis of individual detector beam bundles deflected by said optically deflecting element (1 or 7) lies in the same plane as said primary axis (3) of said objective lens means (4),
   (e) second drive means (9) for rotating said optically deflecting element (1 or 7) about said secondary axis (2),
   (f) first measuring means (17) for measuring the rotation (α) of said optically deflecting element (1 or 7) about the primary axis (3), means for controlling in closed loop fashion the revolutions per time unit of said optically deflecting element, depending on a secondary rotation ($\phi$), so that said revolution becomes the value $$U_\alpha = \frac{U_O}{\cos \phi} ,$$

wherein $\phi$ is the elevational direction of a measuring beam bundle and $U_O$ is the number of revolutions per time unit for $\phi = 0°$, and
   (g) second measuring means (11) for measuring the rotation $\phi/2$ of said optically deflecting element (1 or 7) about the secondary axis (2), and means for controlling the rotational speed of said optically deflecting element in such a way that said rotational speed becomes the value $\dot\phi = U_\alpha \cdot \Delta\phi$, whereby $$\Delta\phi = \frac{s}{f} = \frac{i \cdot a}{f}$$

represents the angular range of said row of detector means (6) and
s is the length of the row of detector means (6),
f is the focal width of said objective lens means (4),
i is the number of the individual detectors in the row, and
a is the distance between the centers of gravity of the individual detectors.

2. The apparatus of claim 1, further comprising a central processing unit, a computer, and memory means for ascertaining and storing in said memory means synchronous signals, angular position values, and time dependent values.

3. The apparatus of claim 2, further comprising counter means (11, 15) connected to said central processing unit, to said first and second drive means, and to said central processing unit (CPU) for measuring said angular position values, first time register means (12, 14) connected to said counter means and to said central processing unit for measuring said time dependent values, second register means (18, 20) having n-positions connected to said counter means, to said first time register means (12, 14) and to said CPU for transferring values from said counter means and from said first time register means into said second register means, and third register means (19) having m-positions connected to said detector means (6) and to said CPU for transferring detected signal values into said third register means, and computer means including memory means connected to said second and third register means and to said CPU for processing values received from said second and third register means.

4. The apparatus of claim 3, further comprising signal discriminator means (13) connected to said detector means (6), to said central processing unit and to said third register means (19) for producing a trigger signal in response to a threshold value being exceeded, said trigger signal controlling a transfer of values from said second and third register means into said memory means of said computer means in such a way that a transfer of detector signals from said third register means into said memory means is completed when m-1 detector signal sequences have been completed following a latest trigger signal, and so that a transfer of angular position values and time dependent values from said second registers into said memory means is completed when n-1 transfers are completed.

5. A method for optical scanning with a device according to claim 1, characterized in that the image speed expressed in surface area per time or the scanning frequency in maintained constant.

6. The apparatus of claim 1, wherein said sensor means comprise a plurality of modular sensor units forming a group, each sensor unit having at least one angular measuring range differing from an angular measuring range of other sensor units in said group, said sensor units of a group being arranged relative to each other so that each sensor unit covers a different portion of a hemispherical space and all units together cover substantially said hemispherical space.

7. The apparatus of claim 6, wherein said group comprises four sensor units, two of which are arranged in a column between two spaced units, said column of two units being set back relative to said two spaced units sufficiently so as not to interfere with a scanning operation of said two spaced units (FIG. 5).

* * * * *

UNITED STATES PATENT AND TRADEMARK OFFICE
CERTIFICATE OF CORRECTION

PATENT NO. : 4,984,892
DATED : January 15, 1991
INVENTOR(S) : Otto Hofmann

It is certified that error appears in the above-identified patent and that said Letters Patent is hereby corrected as shown below:

Column 2, line 33, replace " $\dot{\phi} = U_\alpha \Delta\phi$, whereby" by
-- $\dot{\phi} = U_\alpha \cdot \Delta\phi$, whereby --;

Column 7, line 43, replace " $\phi_1$ = art sin 0.25 = 14.5°"
by -- $\phi_1$ = arc sin 0.25 = 14.5° --;

Column 8, line 11, claim 1c) line 5, replace "optionally"
by -- optically --;

Column 10, line 11, claim 5, line 4, replace "in maintained"
by --is maintained--.

Signed and Sealed this

Nineteenth Day of May, 1992

*Attest:*

DOUGLAS B. COMER

*Attesting Officer*     *Acting Commissioner of Patents and Trademarks*